US011336719B2

(12) United States Patent
Jeuk et al.

(10) Patent No.: US 11,336,719 B2
(45) Date of Patent: *May 17, 2022

(54) IDENTIFYING EDGE CLOUDS WITHIN NETWORKS

(71) Applicant: Cisco Technology, Inc., San Jose, CA (US)

(72) Inventors: Sebastian Jeuk, Munich (DE); Gonzalo A. Salgueiro, Raleigh, NC (US); Sridar Kandaswamy, San Jose, CA (US); Bob C. Melander, Sigtuna (SE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/124,069

(22) Filed: Dec. 16, 2020

(65) Prior Publication Data

US 2021/0105318 A1  Apr. 8, 2021

Related U.S. Application Data

(63) Continuation of application No. 16/261,325, filed on Jan. 29, 2019, now Pat. No. 10,880,368.

(51) Int. Cl.
*H04L 29/08* (2006.01)
*H04L 67/1021* (2022.01)
*H04L 41/16* (2022.01)
*H04W 36/00* (2009.01)
*H04L 41/0816* (2022.01)
*H04W 4/029* (2018.01)
*H04L 47/765* (2022.01)
*H04W 28/02* (2009.01)

(52) U.S. Cl.
CPC ...... *H04L 67/1021* (2013.01); *H04L 41/0816* (2013.01); *H04L 41/16* (2013.01); *H04L 47/767* (2013.01); *H04W 4/029* (2018.02); *H04W 28/0226* (2013.01); *H04W 36/00837* (2018.08)

(58) Field of Classification Search
CPC ..... H04L 67/1021; H04L 41/16; H04L 41/08; H04L 47/767; H04L 43/08; H04W 36/00837; H04W 4/029; H04W 28/0226; H04W 4/50; H04W 36/12
See application file for complete search history.

(56) References Cited

U.S. PATENT DOCUMENTS

2019/0037474 A1*  1/2019  Xu ........................ H04W 64/00
2020/0007460 A1*  1/2020  Guim Bernat ........ G06F 9/5011

OTHER PUBLICATIONS

Maheshwari, D. Raychaudhuri, I. Seskar and F. Bronzino, "Scalability and Performance Evaluation of Edge Cloud Systems for Latency Constrained Applications," 2018 IEEE/ACM Symposium on Edge Computing (SEC), 2018, pp. 286-299, doi: 10.1109/SEC. 2018.00028.*

(Continued)

*Primary Examiner* — Chirag R Patel
(74) *Attorney, Agent, or Firm* — Patterson + Sheridan, LLP

(57) ABSTRACT

Techniques for edge cloud identification. An indication of edge clouds is received. Each edge cloud is uniquely identifiable via an associated edge cloud identifier. A characteristic is received from each of the edge clouds. An edge cloud for communication is determined based on the characteristic. The edge cloud is communicated with using its associated edge cloud identifier.

20 Claims, 10 Drawing Sheets

(56) References Cited

OTHER PUBLICATIONS

L. Tong, Y. Li and W. Gao, "A hierarchical edge cloud architecture for mobile computing," IEEE INFOCOM 2016—The 35th Annual IEEE International Conference on Computer Communications, 2016, pp. 1-9, doi: 10.1109/INFOCOM.2016.7524340.*

* cited by examiner

IDENTIFYING EDGE CLOUDS WITHIN NETWORKS

CROSS-REFERENCE TO RELATED APPLICATIONS

This application is a continuation of co-pending U.S. patent application Ser. No. 16/261,325, filed Jan. 29, 2019. The aforementioned related patent application is herein incorporated by reference in its entirety.

TECHNICAL FIELD

Certain aspects of the present disclosure generally relate to managing network operations, and more specifically, to managing network operations to be performed by edge clouds.

BACKGROUND

Edge computing extends cloud computing to the edge of a network. Edge computing may provide computing, storage, and application services at the network edge for endpoint devices. Edge clouds are becoming more and more relevant, especially for applications in service provider networks, but also for new technologies like fifth-generation (5G) technologies.

BRIEF DESCRIPTION OF THE DRAWINGS

So that the manner in which the above-recited features of the present disclosure can be understood in detail, a more particular description of the disclosure, briefly summarized above, may be had by reference to aspects of the present disclosure, some of which are illustrated in the appended drawings. It is to be noted, however, that the appended drawings illustrate only typical aspects of this disclosure and are therefore not to be considered limiting of its scope, for the disclosure may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DESCRIPTION OF EXAMPLE EMBODIMENTS

Overview

Figure 1:
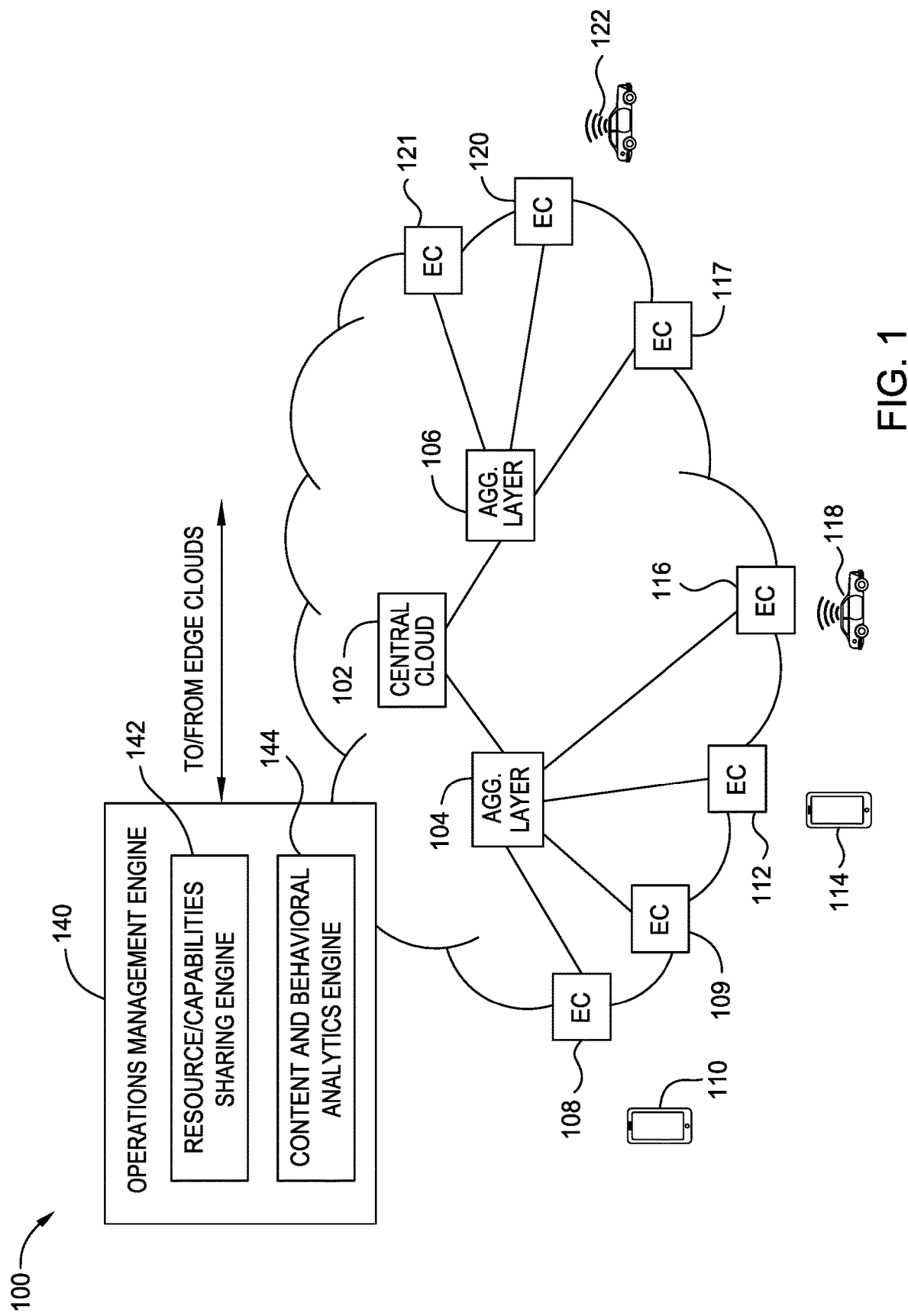
FIG. 1 is a block diagram of a computing system in which one or more aspects of the present disclosure may be implemented.

Certain aspects of the present disclosure provide a computer-implemented method of edge cloud identification. The computer-implemented method includes receiving an indication of edge clouds. Each edge cloud is uniquely identifiable via an associated edge cloud identifier. A characteristic is received from each edge cloud. The characteristic includes at least one of an amount of available resources and one or more capabilities. The computer-implemented method also includes determining an edge cloud for communication, based on the characteristic. The computer-implemented method also includes communicating with the edge cloud using its associated edge cloud identifier.

Certain aspects of the present disclosure provide a computer-implemented method of edge cloud identification. The computer-implemented method includes receiving, at a first edge cloud, an indication of edge clouds other than the first edge cloud. Each edge cloud is uniquely identifiable via an associated edge cloud identifier. The computer-implemented method also includes receiving, from each edge cloud, a characteristic including at least one of an amount of available resources and one or more capabilities. The computer-implemented method also includes determining a second edge cloud for communication, based on the characteristic. The computer-implemented method also includes sending, to a cloud orchestrator, the edge cloud identifier associated with the second edge cloud.

Certain aspects of the present disclosure provide a computer-implemented method of edge cloud identification. The computer-implemented method includes receiving an indication of edge clouds. Each edge cloud is uniquely identifiable via an associated edge cloud identifier. The computer-implemented method also includes obtaining, from an aggregation point of data from cells, traffic information of an endpoint device. The computer-implemented method also includes determining an edge cloud for communication, based on the traffic information. The computer-implemented method also includes communicating with the edge cloud using the edge cloud identifier associated with the edge cloud.

Example Embodiments

Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with little management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Edge computing extends cloud computing to the edge of a network, closer to the user allowing for a more efficient implementation of network functions with lower latency. Edge clouds (ECs) are becoming more and more relevant, especially for applications in service provider networks but also for new technologies like fifth-generation (5G) technologies. ECs may be seen as distributed cloud deployments, whereby elements of clouds are distributed across a large set of hubs/pods. Today, especially when ECs directly integrated into the overall service provider cloud, identification of the ECs is becoming more important. Being able to address/identify ECs, as the overall entity of compute, storage, and potential control resources, allows defining policies specific to an EC, enables forwarding traffic to a specific EC, and enables control function distribution.

Certain aspects of the present disclosure provide an identification approach that addresses ECs within a broader eco-system of clouds. In large environments with hundreds of ECs, their unique identification within the service provider environment is important to apply specific policies, define routing applications on a per-EC basis, or simply use EC identification to associate workloads.

A mobile edge cloud (MEC) is a type of EC that provides computing capabilities at the edge of a mobile network. An MEC enables hosting of applications to provide a low latency interaction with endpoints (e.g., vehicle user-equipment (VUEs)). This is important in applications such as augmented reality (AR), virtual reality (VR) and autonomous vehicle navigation. Real time responses are important for safe functioning and for better user experience.

A few constraints and challenges are currently present with EC's. For example, unlike an enterprise or a more general public cloud, EC's are fairly limited in capacity and capability. Moreover, load prediction can be difficult with users coming into and leaving a cell region associated with an EC. Moreover, offloading more computations to an EC can yield a lower latency response and a better user experience. Issues of hand off as an endpoint (also referred as to user-equipment (UE)) moves to a different cell impacts the EC as well. Loads and capacities across EC's may not be uniform and may vary dynamically at any given time.

Certain aspects of the present disclosure provide a system that is able to address the aforementioned concerns by dynamically selecting an EC for computation. For example, the selection of the EC may be based on a variety of possible options including predictive endpoint behavior (e.g., if an endpoint is likely to move out to a neighboring cell that is better handled by a different MEC), resource availability, and capability sharing across ECs and clustering ECs to share load (e.g., without involving the core cloud). When EC's reach their limits on capacity, workloads may be pushed towards the central cloud which can result in increased latency which may especially be a problem for applications requiring hard real time responses. By selecting ECs by taking into account EC characteristics such as resource availability, the aggregate resources of ECs can be used more efficiently. In certain aspects, the selected EC may be identified via an EC identifier (ECID) to allow for an efficient management of network operations to be performed by the ECs, as described in more detail herein.

FIG. 1 is a block diagram of a computing system 100 in which one or more embodiments of the present disclosure may be implemented. As illustrated a central cloud 102 may be communicatively coupled to multiple ECs though aggregation layers 104, 106.

The central cloud 102 may be communicatively coupled to an EC 108 and an EC 112, through the aggregation layer 104. The EC 108 may be associated with a UE 110 (e.g., an endpoint or mobile device), and the EC 112 may be associated with a UE 114. The EC 116 may be associated with an endpoint 118 (e.g., a VUE) and the EC 120 may be associated with an endpoint 122 (e.g., a VUE). The endpoints described herein may be traveling between cells, each of the cells being associated with different ECs.

In certain aspects, the computing system 100 may include an operations management engine 140 for managing network operations, as described in more detail herein. For example, the operations management engine 140 may include a content and behavioral analytics engine 144 for detecting the content of services being requested from an EC by an endpoint and a behavior (e.g., mobility pattern) of the endpoint to be used to select an EC for performing network operations. The operations management engine 140 may also include a resource/capabilities sharing engine 142 for tracking the capabilities and resource availability of ECs, which may be also be used to select an appropriate EC for the network operations. In certain aspects, the operations management engine 140, including the resource/capabilities sharing engine 142 and the content and behavioral analytics engine 144, may be implemented in software executed by a processing unit (e.g., the processing unit 1016 described herein with respect to FIG. 6). In certain aspects, the operations management engine 140 may be implemented in hardware. The operations management engine 140 may be communicatively coupled with the ECs, or implemented as part of an EC (e.g., EC 108) or the central cloud (e.g., central cloud 102).

Figure 2:
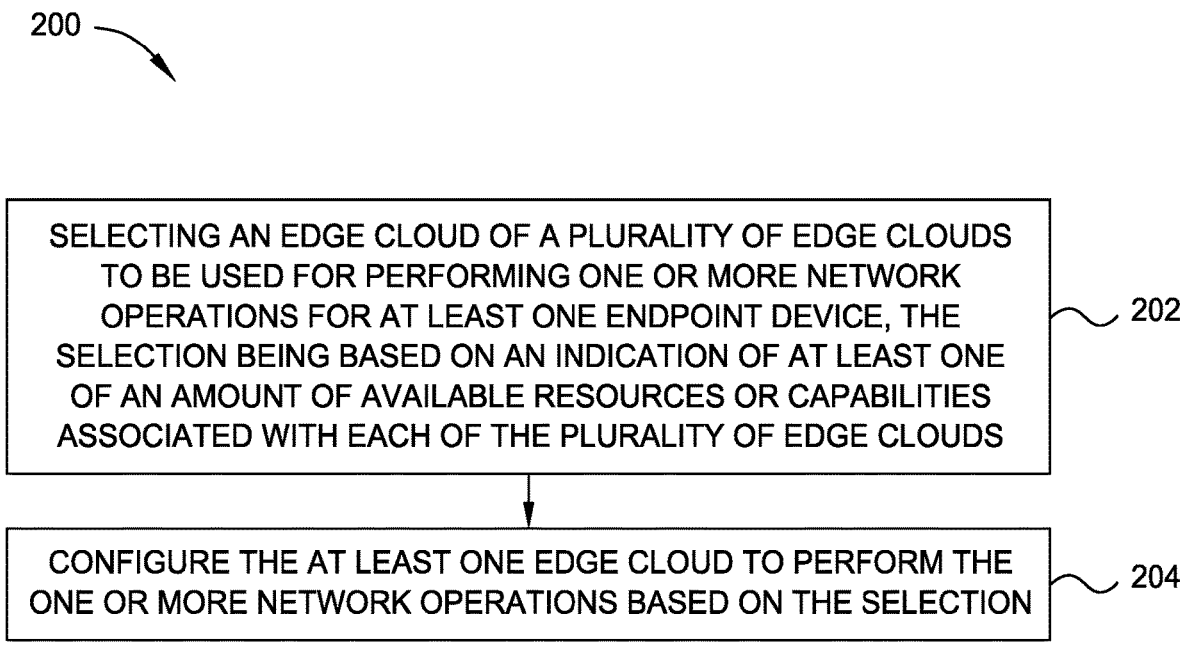
FIG. 2 is a flow diagram illustrating example operations for managing network operations.

FIG. 2 is a flow diagram illustrating example operations 200 for managing network operations. The operations 200 begin, at block 202, by the operations management engine 140 selecting an edge cloud of a plurality of edge clouds to be used for performing one or more network operations. For example, operations management engine 140 may select the edge cloud based on an indication of an amount of available resources or capabilities associated with each of the plurality of edge clouds. In certain aspects of the present disclosure, each of the edge clouds may be associated with an edge cloud ID (ECID), which may be used to manage the network operations, such as apply specific policies, defining routing applications on a per-edge cloud basis or use edge cloud identification to associate workloads.

In certain aspects, the selection of the at least one EC performed at block 202 may be based on an indication received from the plurality of ECs. For example, each EC may advertise its resource availability and capability information, as well as environment capabilities. For example, each EC may send a message to the central cloud 102 or other EC device, indicating their respective resource availability and capabilities. The messages may be sent by the ECs on a periodic basis, may be sent as an on-demand update in case resource availability or capabilities have changed, or sent based on a request by other ECs or the central cloud. In certain aspects, the operations management engine 140 includes a content and behavioral analytics engine 144 that detects the traffic content of each of the ECs and determines the services and resources available at each EC to be used to select the appropriate EC for the network operations.

In certain aspects, the content and behavioral analytics engine 144 may predict that an endpoint will transition to a new cell. In this case, the selection, at block 202, of the edge cloud may be based on the prediction of the new cell. Thus, the edge cloud that is selected may be associated with the new cell and in close proximity to the endpoint. For example, the content and behavioral analytics engine 144 may predict (e.g., based on machine learning algorithm outputs over time) the likelihood of endpoint movement between cells and corresponding ECs, which may be used to determine the EC that is best fits for sharing/load-balancing/offloading resources. In case of a VUE, for example, an EC that is closest to the likely next 5G cell the VUE is likely to move to (e.g., determined via a global positioning system (GPS)) may be the best fit for performing network operations for the VUE.

In certain aspects, the operations management engine 140 also includes a resource/capabilities sharing engine 142 which manages the resource/capabilities messages from the ECs. For example, the resource/capabilities sharing engine 142 may define a matrix of capable ECs that can be used in case a request by an endpoint is made for additional/different resource power. While this is a one element in EC selection, other inputs may be important such as the endpoint behavior (e.g., the mobility pattern of the endpoint) and the requested content (e.g., network operations) to be performed by the EC. For example, the content and behavioral analytics engine 144 may provide relevant information about the requested content from the endpoint and potential endpoint behavior in terms of cell movement. Based on this information, operations management engine 140 may select, at block 202 of FIG. 2, the EC to off-load workload to and provide the best resources for a specific service to be performed for the endpoint.

At block 204, the operations management engine 140 configures the edge cloud to perform the one or more network operations based on the selection performed at block 202. For example, the configuring the at least one edge cloud, at block 204, may involve offloading the one or more network operations to the selected edge cloud (e.g., from EC 108 to EC 112), as described in more detail with respect to FIGS. 3A and 3B.

Figure 3A:
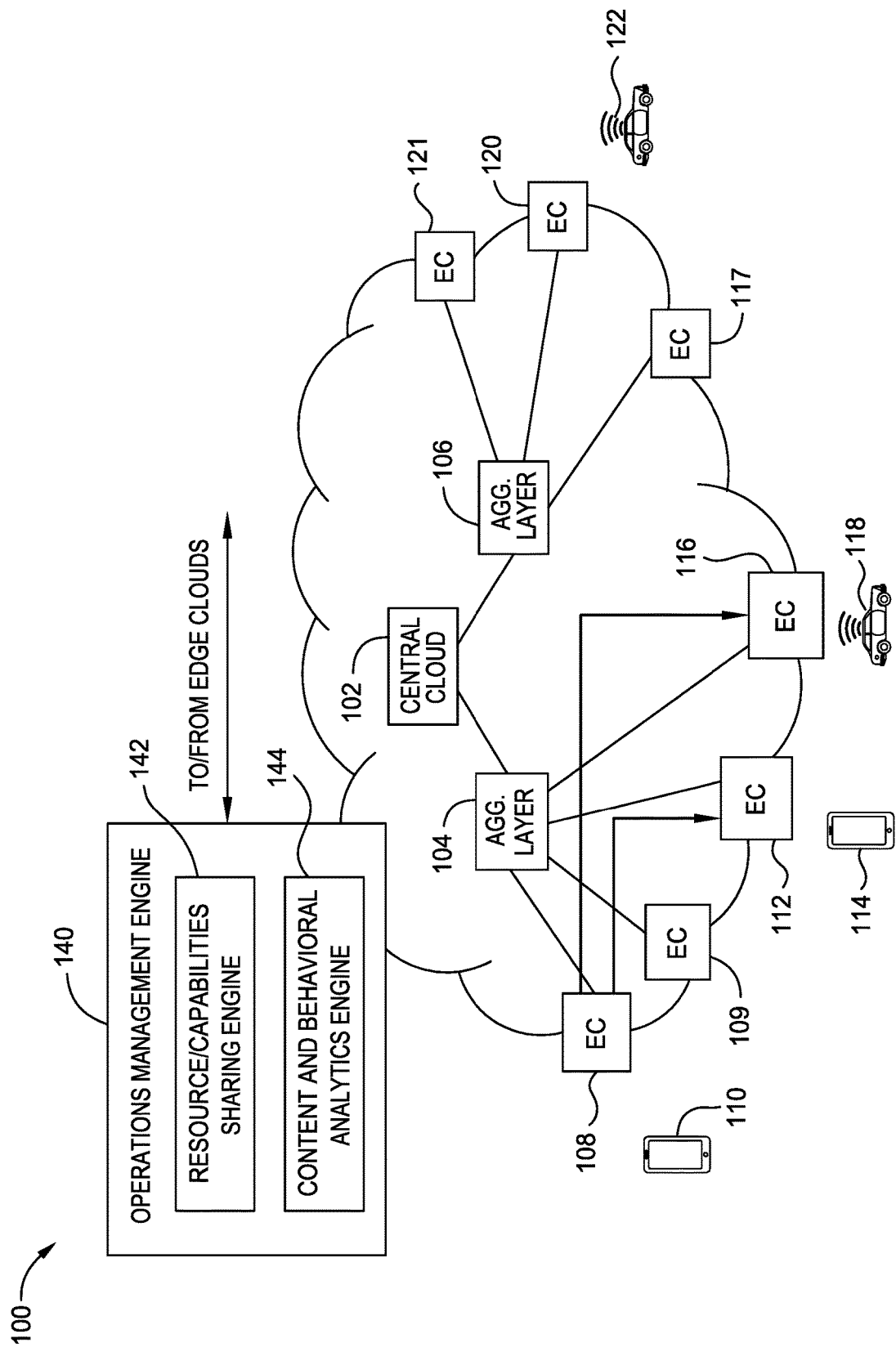
FIGS. 3A and 3B are block diagrams of a computing system implemented for offloading operations, in accordance with certain aspects of the present disclosure.
Figure 3B:
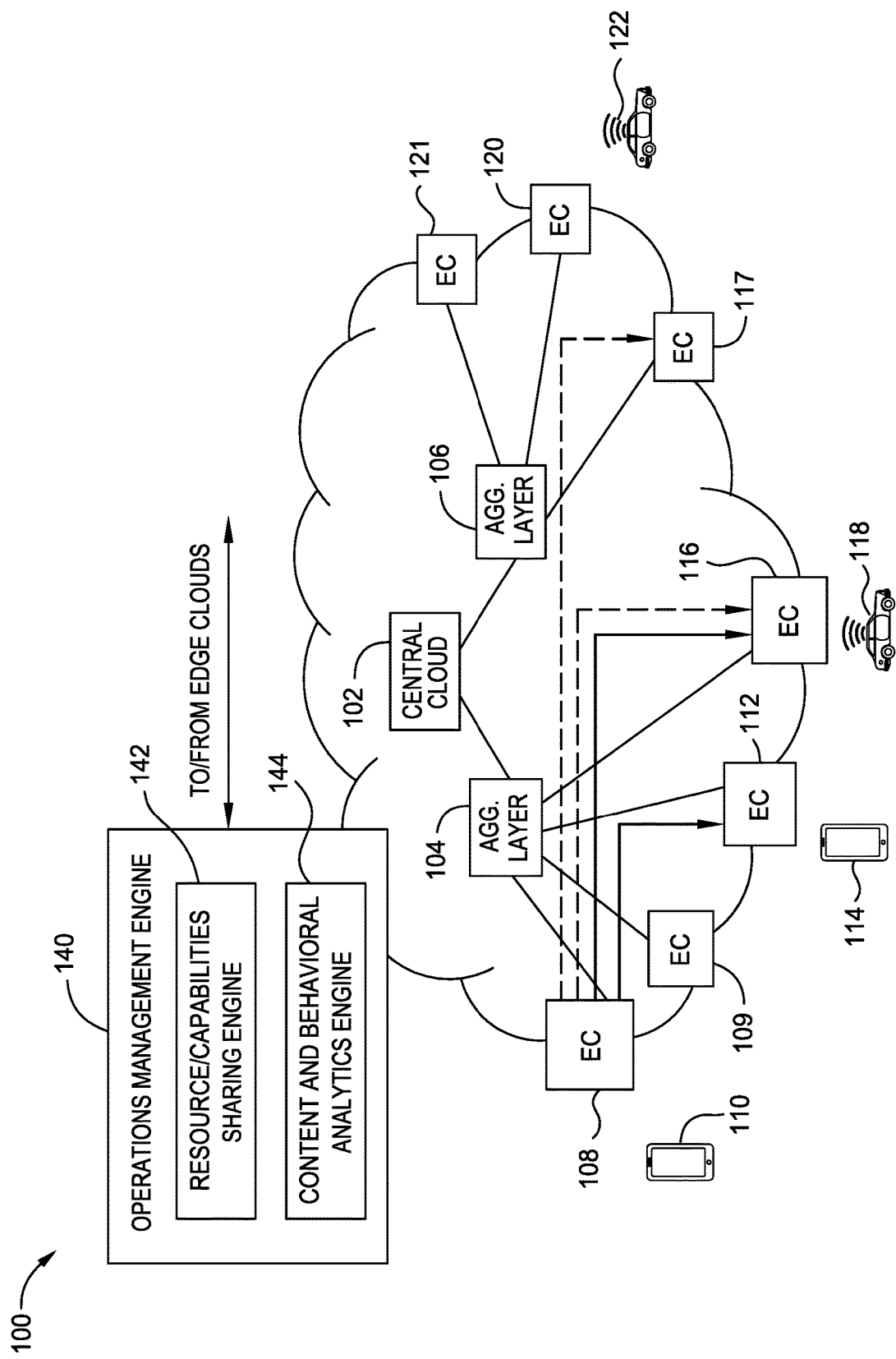

FIGS. 3A and 3B are block diagrams of the computing system 100 implemented for offloading operations, in accordance with certain aspects of the present disclosure. For example, EC 108 may determine to offload network operations to one or more other ECs (e.g., EC 112 and EC 116).

With a hierarchical topology arrangement of the EC's, the EC 108 can access neighboring EC's 112, 116 with a lower latency as compared to a path through the central cloud 102. For example, EC's may exchange messages directly (e.g., without passing the messages through the central cloud 102) with capabilities and current resource availability, as previously described. Moreover, latency estimates may be embedded in the messaging with estimates for each class of capability supported (e.g., video processing, autonomous vehicle navigation data processing, augmented reality (AR), etc.). Based on this information, the EC may predict the best EC candidates to offload tasks. For example, EC 108 may determine that EC 112 and EC 116 are well suited as offload candidates, as illustrated in FIG. 3A. Once this determination has been made, computations performed by EC 108 (e.g., for endpoint 110 that is associated with EC 108) may be offloaded to EC 112 and/or EC 116.

In certain aspects, different candidate ECs may be selected based on different types of workloads (e.g., services), as illustrated in FIG. 3B. For example, EC 108 may select one or more of ECs 112, 116 for a first type of work load, or select one or more of ECs 116, 117 for a second type of workload. For example, ECs 112, 116 may be more suitable for video processing, and the ECs 116, 117 may be more suitable for vehicle navigation data processing.

In certain aspects, each of ECs may have their own sets of candidates for each advertised capability. The candidate ECs may be selected based on predictions on where a handoff may occur. For example, a UE may be on an autonomous vehicle path. The vehicle path (e.g., the mobility pattern of the UE) may be used to predict a cell handoff that will occur, and based on this prediction, an assignment to an EC after the handoff may be made for the UE.

Certain aspects of the present disclosure may be implemented within a service function chain (SFC) environment that is distributed across multiple ECs. For example, an endpoint (e.g., endpoint 110) may be using the SFC to perform certain tasks, such as on-boarding of network functions. While the entry point to the SFC is defined within a local EC, the actual services can be distributed across multiple ECs. Certain aspects of the present disclosure allow for the selection of an efficient service path covering the virtual network functions to perform tasks requested by the endpoint. For example, the resource/capabilities sharing engine 142 may have SFC relevant information, such as the details about network functions within the chain and the operations to be performed within the chain. Based on this information, the resource/capabilities sharing engine 142 may be able to select an appropriate EC cluster to carry out the requested service functions that is appropriate based on the capabilities and resources available at the ECs.

Certain aspects of the present disclosure define a messaging approach that is used by ECs to advertise and inform neighboring ECs about their capabilities, resource availabilities, and supported functions, as described herein. Within an EC environment, each EC advertises resource availability information as well as environment capabilities. Not all ECs may have the same capabilities when it comes to resources, may that be the compute, storage or network resources. In addition, the capabilities an EC provides might be different from the capabilities of an originating EC from which an endpoint is being handed over. The messages including the resource and capability information may be either sent as periodic keep alive like messages (e.g., every 5 minutes to update neighbor interested parties about any updates), may be sent upon a change of resource availability or capability of the EC, or upon request by other ECs, as described herein.

Certain aspects provide a metadata protocol to transport and transmit relevant capability and resource information between ECs (e.g., EC 108 and EC 112). Moreover, certain aspects provide a capability protocol that is dedicated to exchanging updates between ECs. The advantage of a dedicated protocol may be the additional structure in exchanging update messages (e.g., hello, keep alive, dead messages). The lightweight messaging system described herein may transmit reachability details (i.e. IP address), network capabilities (e.g., multiprotocol label switching (MPLS)/virtual private network (VPN) integration), overall resource capabilities, current resource utilizations, and current workload distribution (e.g., already existing workload shares handled by multiple edge clouds). In certain aspects, characteristics of ECs as well as previously handled applications/services may be used to select a suitable EC for providing network functions using machine learning, as described with respect to FIG. 4.

Figure 4:
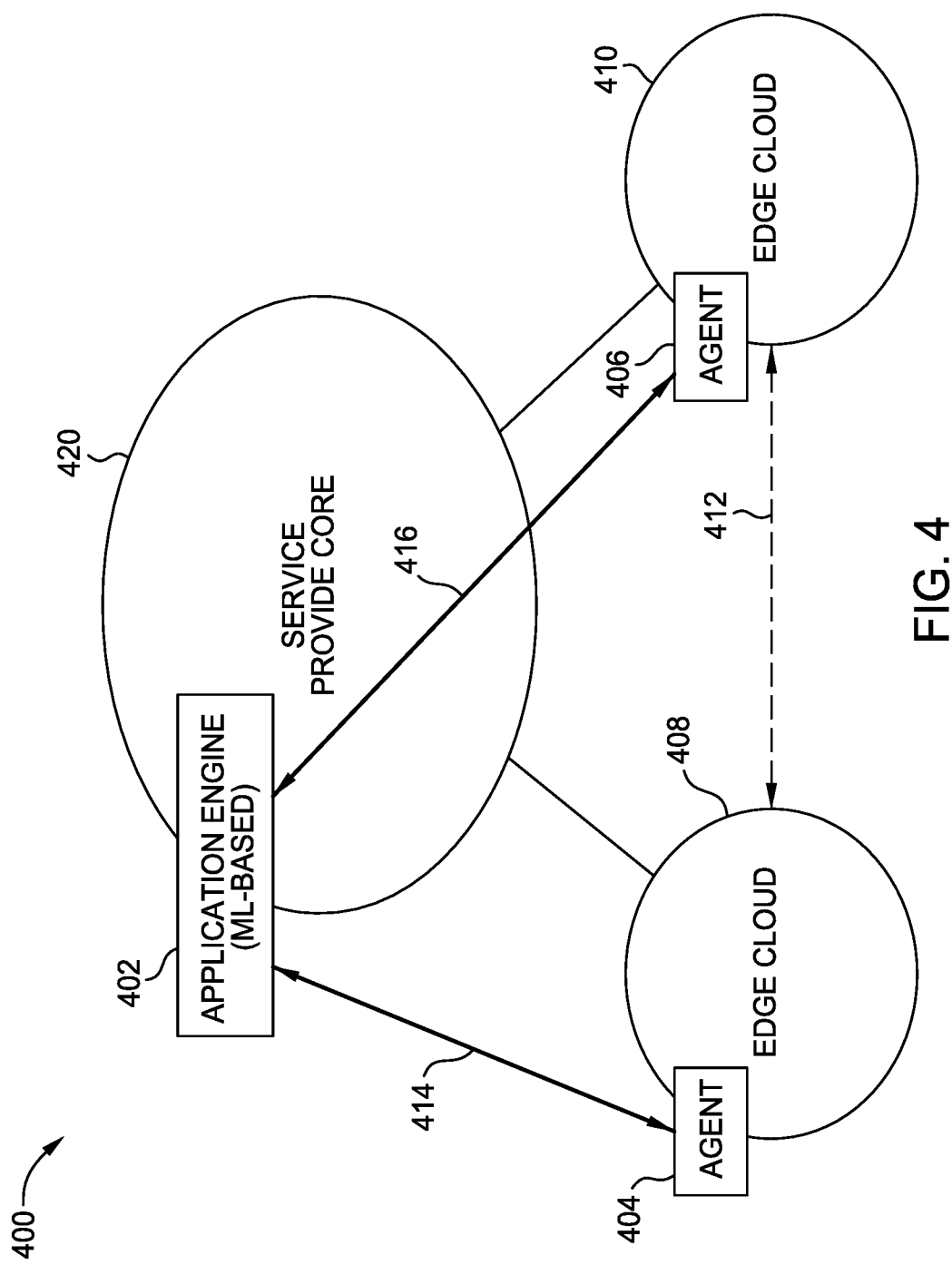
FIG. 4 is a communication system to facilitate machine learning for selection of an edge cloud, in accordance with certain aspects of the present disclosure.

FIG. 4 is a communication system 400 to facilitate machine learning (ML) for selection of an EC, in accordance with certain aspects of the present disclosure. As illustrated, an applicability engine 402 may be implemented at the service provider core 420 to facilitate machine learning for predicting the most optimal application for a certain EC. The algorithm applied by the applicability engine 402, while not restricted to a specific ML algorithm, may receive inputs indicating the characteristics of an EC as well as context information of previously handled applications/services at the edge. The ML algorithm may provide a set of information that may be used to determine if an EC is applicable to a service requested by an endpoint after evaluating the EC's characteristics and resource availability.

In certain aspects, the ECs 408, 410 communicate their capabilities as well as resource availability via communication path 412, allowing one EC to predict the best EC candidate for handoff of an endpoint device, as described herein. The EC 410 may be selected to host one or more services for an endpoint based on the EC's previous experience running certain workloads. As illustrated, the applicability engine 402 may also communicate with agents 404, 406 deployed across ECs via communication paths 414, 416. The agents 402, 406 advertise (e.g., via the lightweight messaging system) the input parameters for the ML algorithm implemented at the applicability engine 402 to predict applicability of particular ECs for specific services/applications.

Certain aspects of the present disclosure also provide an analytics engine that takes into account the outputs/information distributed by the messaging system/applicability engine 402 described herein to predict service demands by enpoints. In certain aspects, the analytics engine may be implemented at the cloud edge as will be described in more detail with respect to FIG. 5. Certain aspects, provide the prediction of endpoint movements based on historical data in the context of a specific applications/services and endpoint behavior, as described herein.

Figure 5:
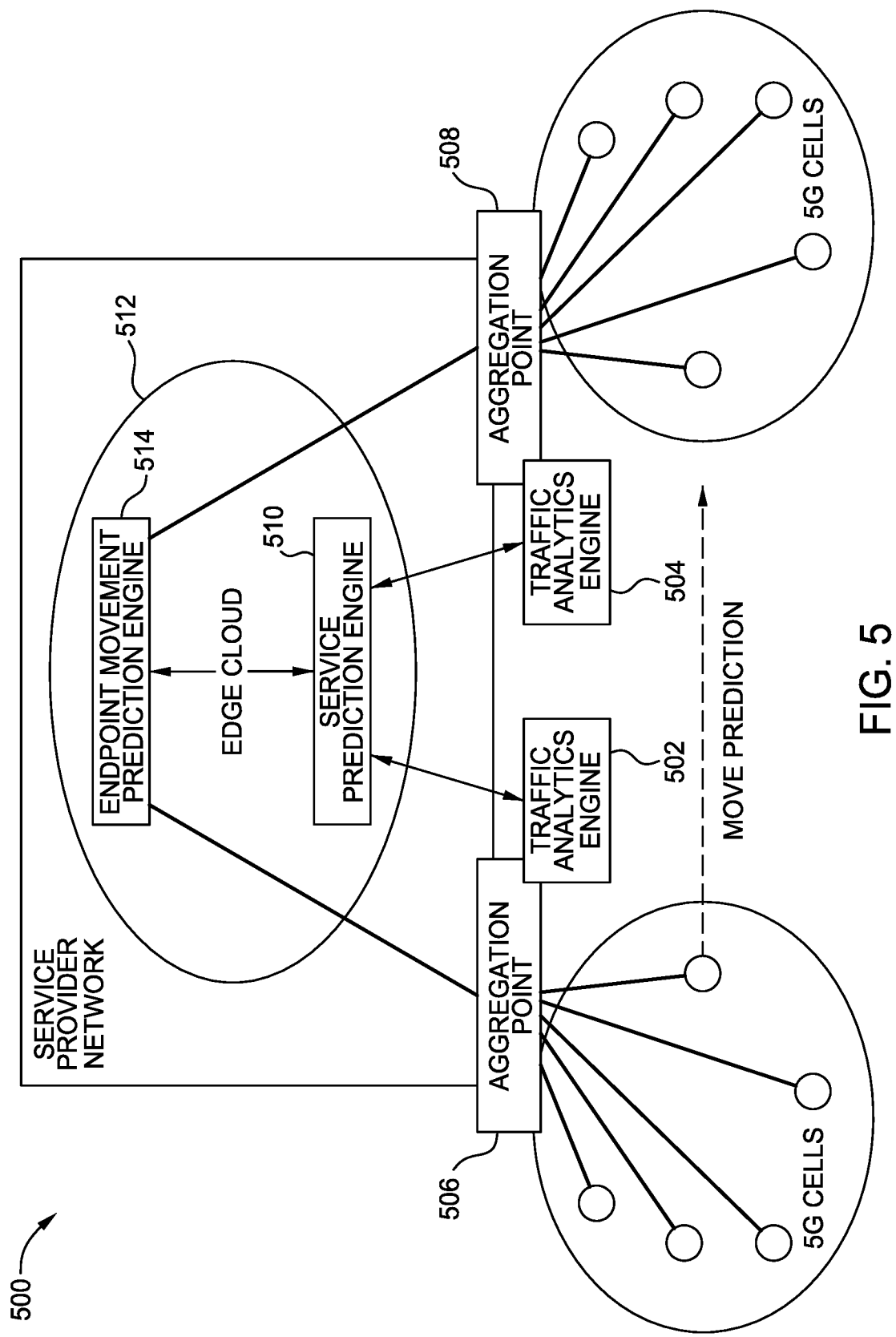
FIG. 5 is a communication system 500 with analytics engines, in accordance with certain aspects of the present disclosure.

FIG. 5 is a communication system 500 implemented with analytics engines 502, 504, in accordance with certain aspects of the present disclosure. As illustrated, the analytics engines 502, 504 inspect traffic passing the aggregation points 506, 508 and predict traffic context of endpoints over time. The aggregation points 506, 508 aggregate traffic from multiple cells (e.g., 5G cells) that may be in communication with endpoint devices. The information from the analytics engines 502, 504 is fed back to a service prediction engine 510 implemented at an EC 512 (e.g., corresponding to the EC 108 described with respect to FIGS. 3A and 3B).

The analytics engines 502, 504 may use a large set of traffic feature input information to predict context over time for endpoints within a specific cell, as well as across cells by sharing results between traffic analytics engines. As a result, the analytics engine provides information to the service prediction engine 510, the service prediction engine 510 being used within the EC 512 to predict which services or network functions that are likely going to be needed by a particular endpoint to predict a suitable EC.

Figure 6:
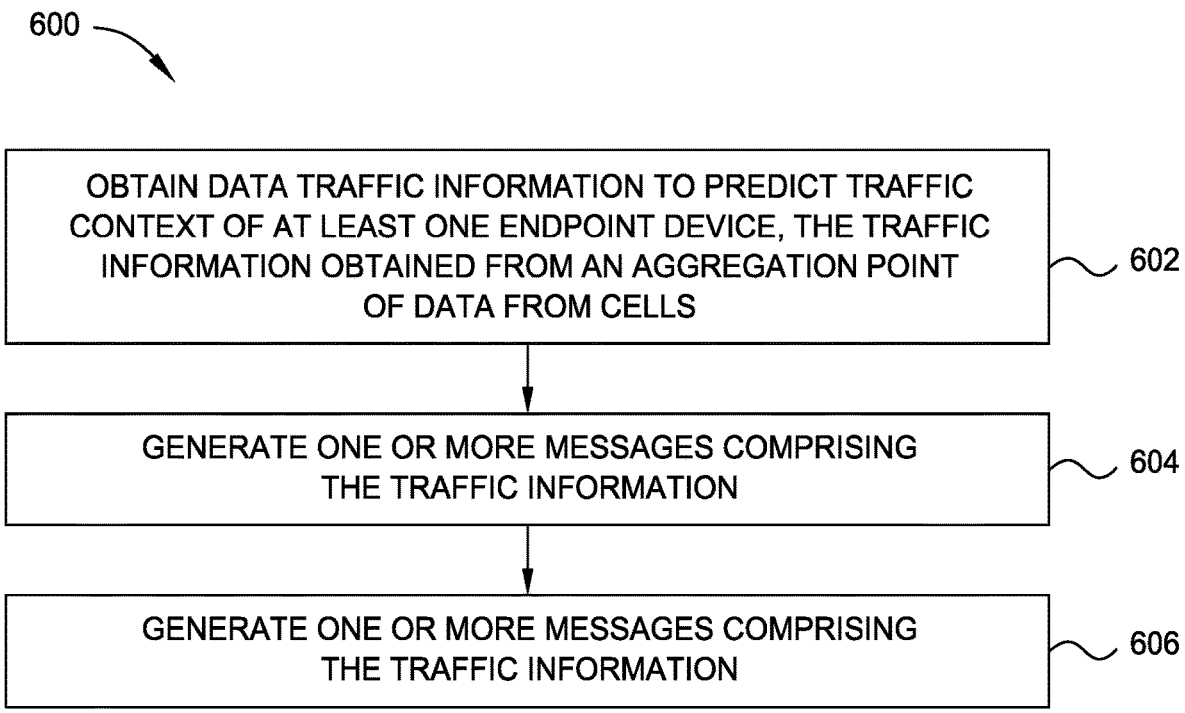
FIG. 6 is a flow diagram illustrating example operations for managing network operations via analytics engines, in accordance with certain aspects of the present disclosure.

FIG. 6 is a flow diagram illustrating example operations 600 for managing network operations. The operations 600 begin, at block 602, by a traffic analytics engine (e.g., the traffic analytics engine 502) obtaining data traffic information to predict traffic context of at least one endpoint device, the traffic information obtained from an aggregation point (e.g., aggregation point 506) of data from cells. The operations 600 also include, at block 604, generating one or more messages comprising the traffic information, and at block 606, sending an indication of the traffic information to an edge cloud (e.g., EC 512).

In certain aspects, the EC 512 may host an endpoint movement prediction engine 514 that can be used to predict the movements of endpoints within the access layer (i.e. the 5G cell) based on specific behavioral events of endpoints. For instance, the endpoint movement prediction engine 514 may receive information indicating the traffic pattern of endpoint devices from a traffic analytics engine, as described with respect to FIG. 6. In certain aspects, the content and behavioral analytics engine 144 described with respect to FIGS. 3A and 3B may include the service prediction engine 510 and the endpoint movement prediction engine 514 for detecting the content of services being requested from an EC by an endpoint and a behavior (e.g., mobility pattern) of the endpoint to be used to select an EC for performing network operations.

Figure 7:
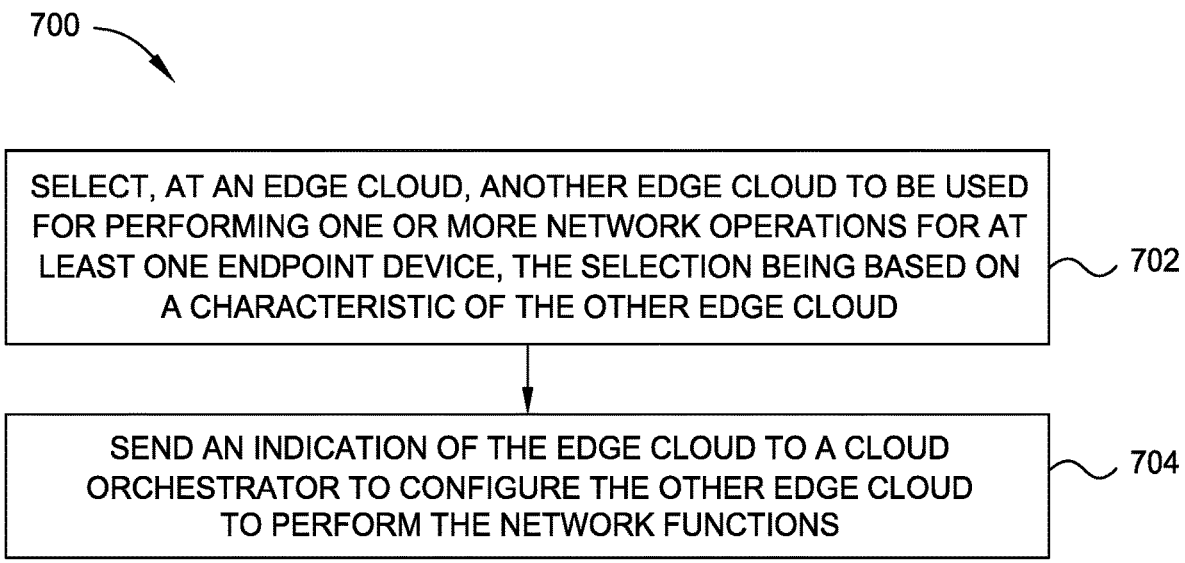
FIG. 7 is a flow diagram illustrating example operations for selecting an edge cloud, in accordance with certain aspects of the present disclosure.

FIG. 7 is a flow diagram illustrating example operations 700 for managing network operations. The operations 700 may begin, at block 702, by the resource/capabilities sharing engine 142 selecting, at an edge cloud, another edge cloud to be used for performing one or more network operations for at least one endpoint device, the selection being based on a characteristic of the other edge cloud. For example, the resource/capabilities sharing engine 142 may receive a message from the other edge cloud indicating at least one of an amount of available resources or capabilities associated with the other edge cloud, based on which the selection of the other edge cloud may be made.

In certain aspects, the endpoint movement prediction engine 514 may predict that the endpoint device will transition to a new cell. In this case, the other edge cloud may be associated with the new cell, and the selection of the other edge cloud may be based on the prediction by the endpoint movement prediction engine 514, as described herein.

In certain aspects, the operations 700 also include the service prediction engine 510 receiving data traffic information (e.g., from the traffic analytics engine 502) associated with the endpoint device gathered from a data aggregation point (e.g., aggregation point 506) of cells. In this case, the service prediction engine 510 predicts the one or more network functions to be provided to the endpoint based on the data traffic information, where the selection of the other edge cloud is based on the prediction by the service prediction engine 510.

The resource/capability sharing engine 142 describes with respect to FIGS. 3A and 3B may leverage the outputs of engines described herein to determine an edge cloud within a logical proximity of endpoints (e.g., UE 118) to optimize service delivery at the edge. For example, the resource/capability sharing engine 142 may combine the outputs of engines described herein to predict a suitable EC to be used for providing services to endpoints. For instance, the determination at the resource/capability sharing engine 142 may be based on the traffic analytics engine 504 results (e.g., the context of the traffic flow of endpoints), the output of the service predication engine 510 as well as the endpoint movement prediction engine 514. The combination of the information obtained by the resource/capability sharing engine enables a sophisticated and well-defined prediction of the most suitable edge cloud to be used for providing services to specific endpoints.

In certain aspects, the operations 700 also include, at block 704, the resource/capability sharing engine 142 sending an indication of the EC to a cloud orchestrator to configure the other edge cloud to perform the network functions. For instance, the resource/capability sharing engine 142 may generate an output of a specific EC (or potentially a weighted shared EC construct) that may be fed back to a cloud orchestrator to assure accurate scheduling for providing services to an endpoint and that the most suitable forwarding is preconfigured.

In certain aspects of the present disclosure, each EC may be assigned an ECID to facilitate the scheduling of specific ECs based on the output from the resource/capability sharing engine 142, as described in more detail herein. For example, each of the ECs 108, 109, 112, 116, 117, 120, 121 may be assigned an ECID, which may be used by the cloud orchestrator to assign one of ECs to perform one or more network functions for an endpoint.

In certain aspects, each EC may be identified with a "virtual" segment routing (SR) ID (e.g., an SRv6 ID), whereby network functions running on top of the edge cloud are identified with a hierarchical segment routing ID. The ECID (e.g., segment routing ID) of an EC may be encapsulated in a segment routing (e.g., SRv6) packet to be sent to the EC. Segment routing is only one possible metadata approach that would allow transmitting the identification information of ECs. Others approaches include a network service header (NSH), IPv6 extension headers, or in-band operations and maintenance (iOAM) messages.

In certain aspects, ECIDs may be used within a 5G environment when endpoints move between 5G cells (e.g., as determined by the endpoint movement prediction engine 514 described with respect to FIG. 5). For example, each cell may be associated with one or more ECs. When an endpoint moves from one cell to another, the EC associated with the previous cell that the endpoint was associated with may no longer be ideal to serve the network functions of the endpoint. Thus, based on the prediction that the endpoint is moving to a new cell, a new EC may be selected and configured to provide network functions for the endpoint via the ECID of the new EC.

In certain aspects, endpoints may define segments that traffic should pass through to assure certain network functions are provided. When roaming between cells, the network function addressed by a specific segment routing ID may be updated since previous IDs might no longer be ideal location wise, edge cloud wise, etc. By having ECIDs associated to ECs, an endpoint may no longer have to be aware of what segment routing IDs to use for which cells. Rather, in certain aspects of the present disclosure, the ECID of the new cell may be specified along with an anycast ID (e.g., anycast SRv6 ID) associated with a set of network functions to be performed. Thus, by combining the ECID with the anycast ID of the network function, endpoints within the network may no longer have to know specific network function IDs. Rather, when moving between cells, endpoints may adjust the ECID specific to the cell and maintain the anycast ID associated with the desired network functions. In certain aspects, the ECID may be transmitted as part of the authentication/roaming process of the endpoint with the new cell.

Figure 8:
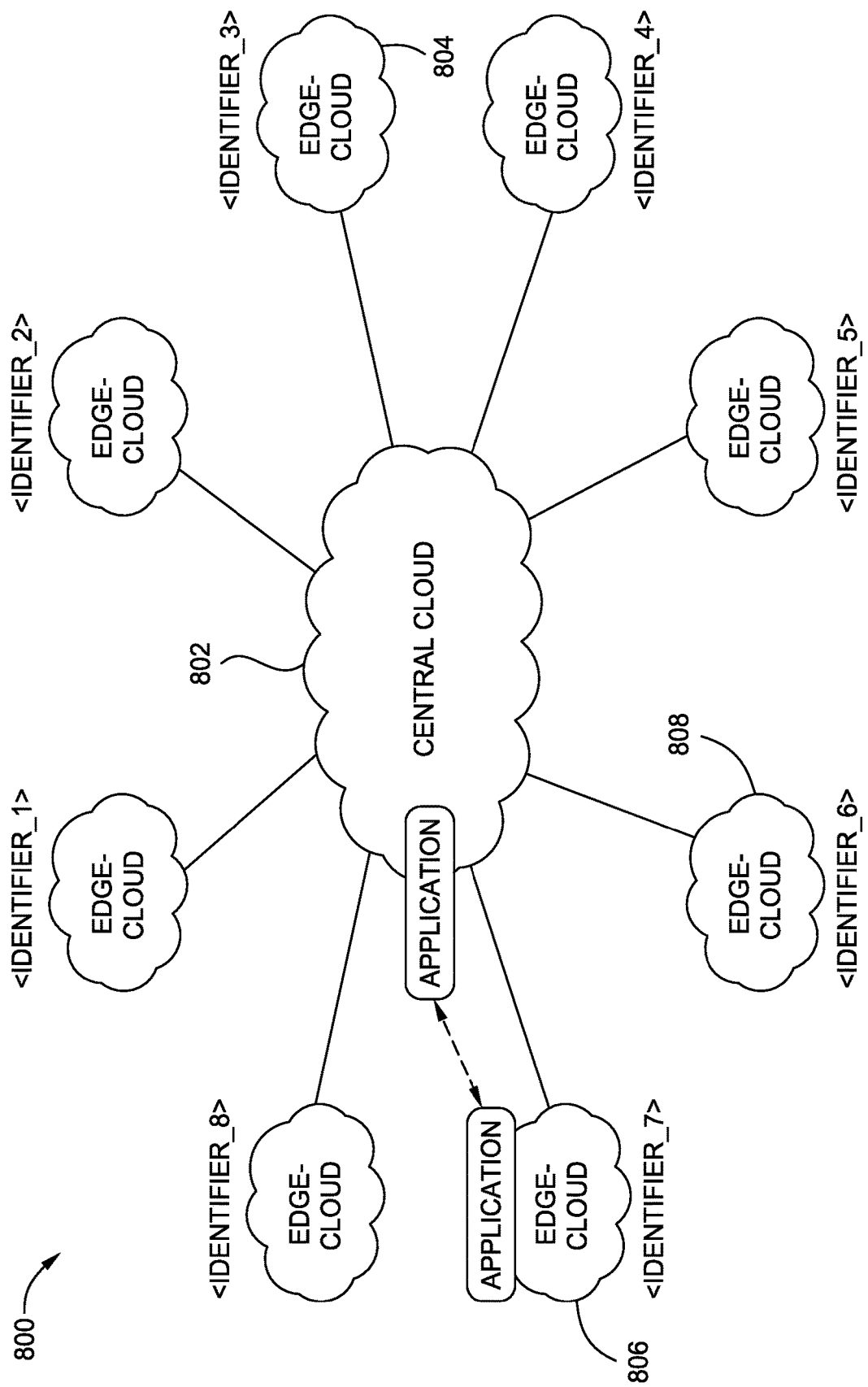
FIG. 8 is a block diagram of a computing system for managing network operations with edge cloud identifiers, in accordance with certain aspects of the present disclosure.

FIG. 8 is a block diagram of a computing system 800 for managing network operations with ECIDs, in accordance with certain aspects of the present disclosure. As illustrated, the central cloud 802 may be communicatively coupled with several ECs, each of the ECs being associated with an ECID (e.g., identifier_1 to identifier_8). The ECIDs may be used by the central cloud 802 to define policies for traffic flow at the application layer, or at the network/transport layer. For example, ECID of the EC 808 may be used on the network layer to define policies for managing network operations by the EC 808. The central cloud 802 may have access to the ECIDs of the ECs, as well as respective characteristics of each of the ECs. For example, the central cloud 802 may implement workload sharing operations via the ECIDs. For instance, workload may be shared and scheduled by central cloud 802 with the EC 804 having the ECID (identifier_3) of the EC 804. Moreover, the central cloud 802 may select EC 806 and deploy the same application on the central cloud 802 as well as on the EC 806, as illustrated.

In certain aspects, ECIDs may be used for wide-area network (WAN) technologies, and more specifically, for WAN tunnel setup and configuration. Typically, communication tunnels may be defined using internet-protocol (IP) addresses. In certain aspects of the present disclosure, a communication tunnel may be defined using an ECID such that data traffic may be directed to a particular EC as selected by the central cloud or other ECs. For example, EC 806 may setup a tunnel for communication with EC 804 for data communication by having access to the ECID (identifier_3) of EC 804.

In certain aspects, the ECIDs may be used to implement a distributed control system for the cloud. Currently, ECs may be deployed as individual clouds. However, with the importance of ECs being as small in footprint as possible, while providing the maximal compute/storage resources, removing control components can improve performance. Having the capability to individually address edge clouds within the overall cloud environment allows policies to be implemented for each individual EC. This is also important for defining a distributed control function. With the implementation of ECIDs associated with edge clouds, on-demand, lightweight, and context-aware control functions may be implemented at the edge. For example, the core cloud may be able to push out control functions specific to tasks that are to be performed by a specific edge cloud. For example, if a virtual machine has to be deployed at an edge cloud, a compute control plane may be pushed to the edge cloud with via the ECID of the edge cloud.

In certain aspects, ECIDs may be used by UEs to select specific ECs for communication. For example, a UE may be provided a group of ECs to select from, and their respective ECIDs, as described in more detail with respect to FIG. 5.

Figure 9:
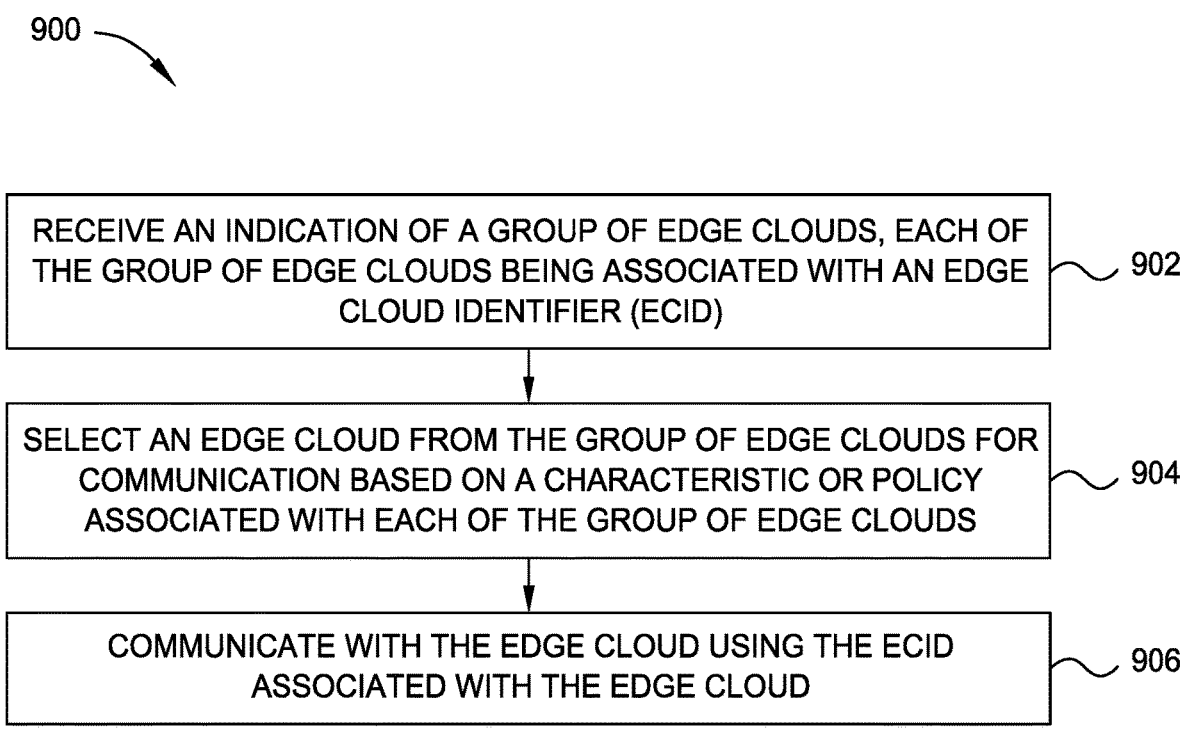
FIG. 9 is a flow diagram illustrating example operations for managing network operations by a user-equipment (UE), in accordance with certain aspects of the present disclosure.

FIG. 9 is a flow diagram illustrating example operations 900 for managing network operations. The operations 900 may be performed by a UE, such as the UE 110.

The operations 900 begin at block 902, where a UE receives an indication of a group of edge clouds, each of the group of edge clouds being associated with an ECID. In certain aspects, the indication of the group of edge clouds may be received as part of an authentication process with a cell (e.g., a 5G cell) associated with the group of edge clouds. For example, when the UE 110 is handed off to a new cell, the UE may begin an authentication process with the new cell, during which the UE 110 may receive an indication of the group of edge clouds, and their respective ECIDs, associated with the new cell.

At block 904, the UE may select an edge cloud from the group of edge clouds for communication based on a characteristic (e.g., capability or resource availability) or policy associated with the edge cloud. At block 906, the UE communicates with the edge cloud using the ECID associated with the edge cloud. For example, communicating with the edge cloud may include generating and sending a packet to the edge cloud, the packet indicating the ECID of the edge cloud. The packet may request certain network functions to be performed. For example, the packet may include an anycast ID associated with a set of network functions to be performed for the packet. One or more of the set of network functions may be hosted by the selected edge cloud.

In certain aspects, the ECIDs may be used for WAN tunnel setup and configuration, as previously described. For example, communicating with the edge cloud, at block 906, may involve deploying a communication tunnel with the edge cloud via the EC ID of the edge cloud.

Figure 10:
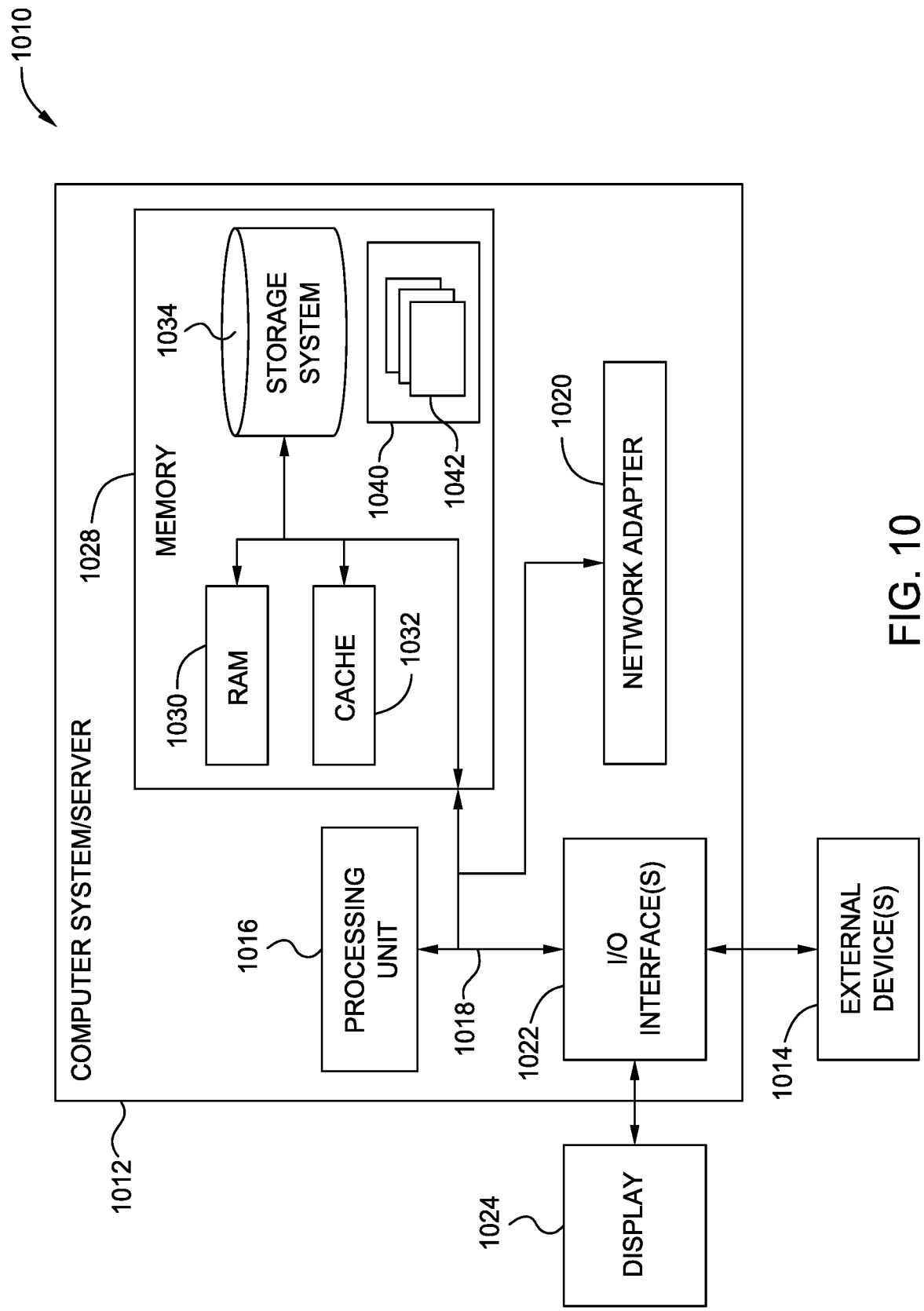
FIG. 10 is a schematic of an example of a computing device.

FIG. 10 is a schematic of an example of a computing device 1010, such as a cloud device (e.g., central cloud 102), an EC, or a user-equipment (e.g., UE 110). The computing device 1010 is only one example of a suitable computing device and is not intended to suggest any limitation as to the scope of use or functionality of embodiments of the invention described herein. Regardless, the computing device 1010 is capable of being implemented and/or performing any of the functionality set forth hereinabove. In computing device 1010 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in computing device 1010 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures.

Computer system/server 1012 may include a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via I/O interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method of edge cloud identification, the computer-implemented method comprising:
   receiving an indication of a plurality of edge clouds, wherein each of the plurality of edge clouds is uniquely identifiable via an edge cloud identifier associated with the respective edge cloud;
   receiving, from each of the plurality of edge clouds, a respective characteristic comprising at least one of an amount of available resources and one or more capabilities;
   determining a set of one or more edge clouds of the plurality of edge clouds to perform one or more network operations for an endpoint device, wherein each edge cloud in the set is determined based on the respective characteristic of the respective edge cloud and by operation of one or more computer processors; and
   deploying a service function chain for the set of one or more edge clouds to perform the one or more network operations, wherein each edge cloud in the set is configured using the edge cloud identifier associated with the respective edge cloud.

2. The computer-implemented method of claim 1, further comprising providing a prediction of whether the endpoint device will transition from a current cell to a new cell, wherein the prediction is based on a mobility pattern of the endpoint device, wherein at least one edge cloud in the set is determined based further on context information generated using machine learning based on previously handled services by each of the plurality of edge clouds, wherein an indication of the at least one edge cloud is sent to a cloud orchestrator.

3. The computer-implemented method of claim 2, further comprising:
receiving data traffic information associated with the endpoint device, wherein the data traffic information is gathered from a data aggregation point configured to aggregate traffic from multiple cells; and
predicting the one or more network operations to be performed for the endpoint, based on the data traffic information.

4. The computer-implemented method of claim 3, wherein the computer-implemented method is performed by a cloud device executing the cloud orchestrator, wherein configuring the set of one or more edge clouds includes offloading the one or more network operations from the cloud device to the set.

5. The computer-implemented method of claim 4, wherein the at least one edge cloud is determined based further on a predetermined hierarchy of the plurality of edge clouds for performing the one or more network operations;
wherein configuring the at least one edge cloud includes sharing workload, of the cloud device, with the at least one edge cloud via at least one edge cloud identifier associated with the at least one edge cloud.

6. The computer-implemented method of claim 5, further comprising identifying a service type of the one or more network operations, wherein the at least one edge cloud is determined based further on the prediction and the service type.

7. The computer-implemented method of claim 1, wherein at least one edge cloud in the set is determined based further on context information generated using machine learning based on previously handled services by each of the plurality of edge clouds.

8. The computer-implemented method of claim 1, wherein configuring at least one edge cloud in the set includes sending at least one edge cloud identifier associated with the at least one edge cloud to a cloud orchestrator to configure the at least one edge cloud.

9. The computer-implemented method of claim 1, further comprising providing a prediction of whether the endpoint device will transition from a current cell to a new cell, wherein the prediction is based on a mobility pattern of the endpoint device.

10. The computer-implemented method of claim 1, further comprising:
receiving data traffic information associated with the endpoint device, wherein the data traffic information is gathered from a data aggregation point configured to aggregate traffic from multiple cells; and
predicting the one or more network operations to be performed for the endpoint, based on the data traffic information.

11. The computer-implemented method of claim 1, wherein the computer-implemented method is performed by a cloud device, wherein configuring the set of one or more edge clouds includes offloading the one or more network operations from the cloud device to the set.

12. The computer-implemented method of claim 1, wherein the computer-implemented method is performed by a cloud device, wherein configuring at least one edge cloud in the set includes sharing workload, of the cloud device, with the at least one edge cloud via at least one edge cloud identifier associated with the at least one edge cloud.

13. The computer-implemented method of claim 1, wherein at least one edge cloud in the set is determined based further on a predetermined hierarchy of the plurality of edge clouds for performing the one or more network operations.

14. A computer-implemented method of edge cloud identification, the computer-implemented method comprising:
receiving, at a first edge cloud, an indication of a plurality of edge clouds other than the first edge cloud, wherein each of the plurality of edge clouds is uniquely identifiable via an edge cloud identifier associated with the respective edge cloud;
receiving, from each of the plurality of edge clouds, a respective characteristic comprising at least one of an amount of available resources and one or more capabilities;
determining a set of one or more edge clouds of the plurality of edge clouds to perform one or more network operations for an endpoint device, wherein each edge cloud in the set is determined based on the respective characteristic of the respective edge cloud and by operation of one or more computer processors; and
deploying a service function chain for the set of edge clouds to perform the one or more network operations, including sending, to a cloud orchestrator, the respective edge cloud identifier associated with each edge cloud in the set.

15. The computer-implemented method of claim 14, further comprising:
receiving, at the first edge cloud, data traffic information associated with the endpoint device, wherein the data traffic information is gathered from a data aggregation point of configured to aggregate traffic from multiple cells; and
predicting, at the first edge cloud, the one or more network operations to be performed for the endpoint device, based on the data traffic information.

16. A computer-implemented method of edge cloud identification, the computer-implemented method comprising:
receiving an indication of a plurality of edge clouds, wherein each of the plurality of edge clouds is uniquely identifiable via an edge cloud identifier associated with the respective edge cloud;
obtaining traffic information of an endpoint device, wherein the traffic information is obtained from an aggregation point configured to aggregate traffic from multiple cells;
determining, based on the traffic information and by operation of one or more computer processors, a set of one or more edge clouds of the plurality of edge clouds to perform one or more network operations for the endpoint device; and
deploying a service function chain for the set of one or more edge clouds to perform the one or more network operations, wherein each edge cloud in the set is configured using the edge cloud identifier associated with the respective edge cloud.

17. The computer-implemented method of claim 16, wherein based on the traffic information, a prediction of whether the endpoint device will transition from a current cell to a new cell is generated by an endpoint movement prediction engine.

18. The computer-implemented method of claim 16, wherein the one or more network operations to be performed for the endpoint device are predicted by a service prediction engine.

19. The computer-implemented method of claim 16, wherein the traffic information is obtained by a traffic analytics engine.

20. The computer-implemented method of claim 14, further comprising identifying a service type of the one or more network operations, wherein at least one edge cloud in the set is determined based further on the service type.

* * * * *

UNITED STATES PATENT AND TRADEMARK OFFICE
CERTIFICATE OF CORRECTION

| | | |
|---|---|---|
| PATENT NO. | : 11,336,719 B2 | Page 1 of 1 |
| APPLICATION NO. | : 17/124069 | |
| DATED | : May 17, 2022 | |
| INVENTOR(S) | : Sebastian Jeuk et al. | |

It is certified that error appears in the above-identified patent and that said Letters Patent is hereby corrected as shown below:

In the Specification

In Column 10, Line 67, delete "EC ID" and insert -- ECID --.

In the Claims

In Column 16, Line 38 (Approx.), in Claim 15, delete "point of" and insert -- point --.

Signed and Sealed this
Fourth Day of October, 2022

Katherine Kelly Vidal
*Director of the United States Patent and Trademark Office*